(12) United States Patent
Sakakima et al.

(10) Patent No.: US 8,405,754 B2
(45) Date of Patent: Mar. 26, 2013

(54) IMAGE PROCESSING APPARATUS AND CONTROL METHOD FOR IMAGE PROCESSING APPARATUS

(75) Inventors: Eito Sakakima, Tokyo (JP); Tetsu Fukuda, Yokohama (JP); Yuji Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 12/788,231

(22) Filed: May 26, 2010

(65) Prior Publication Data

US 2010/0302429 A1     Dec. 2, 2010

(30) Foreign Application Priority Data

Jun. 1, 2009   (JP) .................. 2009-131829

(51) Int. Cl.
*H04N 5/335*   (2006.01)
(52) U.S. Cl. ......... 348/333.05; 348/333.01; 348/333.02; 348/333.12
(58) Field of Classification Search ............. 348/333.01, 348/333.02, 333.05, 333.11, 333.12
See application file for complete search history.

(56) References Cited

U.S. PATENT DOCUMENTS

2008/0292212 A1* 11/2008 Ozaki ...................... 382/284

FOREIGN PATENT DOCUMENTS

JP    2008-269490 A    11/2008

* cited by examiner

*Primary Examiner* — John Villecco
*Assistant Examiner* — Mark Monk
(74) *Attorney, Agent, or Firm* — Carter, DeLuca, Farrell & Schmidt LLP

(57) ABSTRACT

An image analysis unit analysis information appended to an image and calculates the image capture time for each of the images. A time difference calculating unit calculates the image capture time difference between images arranged by an image managing unit by referring to the image capture time for each of the images calculated by the image analysis unit. A user instruction information managing unit sets a threshold that is used in the selection of images to be displayed in one screen and that serves as a determination reference for time differences based on input information of the user. The display determination unit compares an image capture time difference calculated by the time difference calculating unit and a threshold set by the user instruction information managing unit, and selects the images that satisfy this threshold as images to be display in the screen. A display processing unit displays thumbnails of images selected by the display determining unit in an index display in one screen in an image capture time sequence.

12 Claims, 13 Drawing Sheets

FIG. 6

| ID | THRESHOLD |
|----|-----------|
| 0 | 0 |
| 1 | 1 HOUR |
| 2 | 6 HOURS |
| 3 | 12 HOURS |
| 4 | 1 DAY (24 HOURS) |
| 5 | 1 WEEK (7 DAYS) |
| 6 | 1 MONTH |
| 7 | 3 MONTHS |
| 8 | 6 MONTHS |
| 9 | 1 YEAR (12 MONTHS) |

+ BUTTON: INCREMENT ID BY 1
− BUTTON: DECREMENT ID BY 1

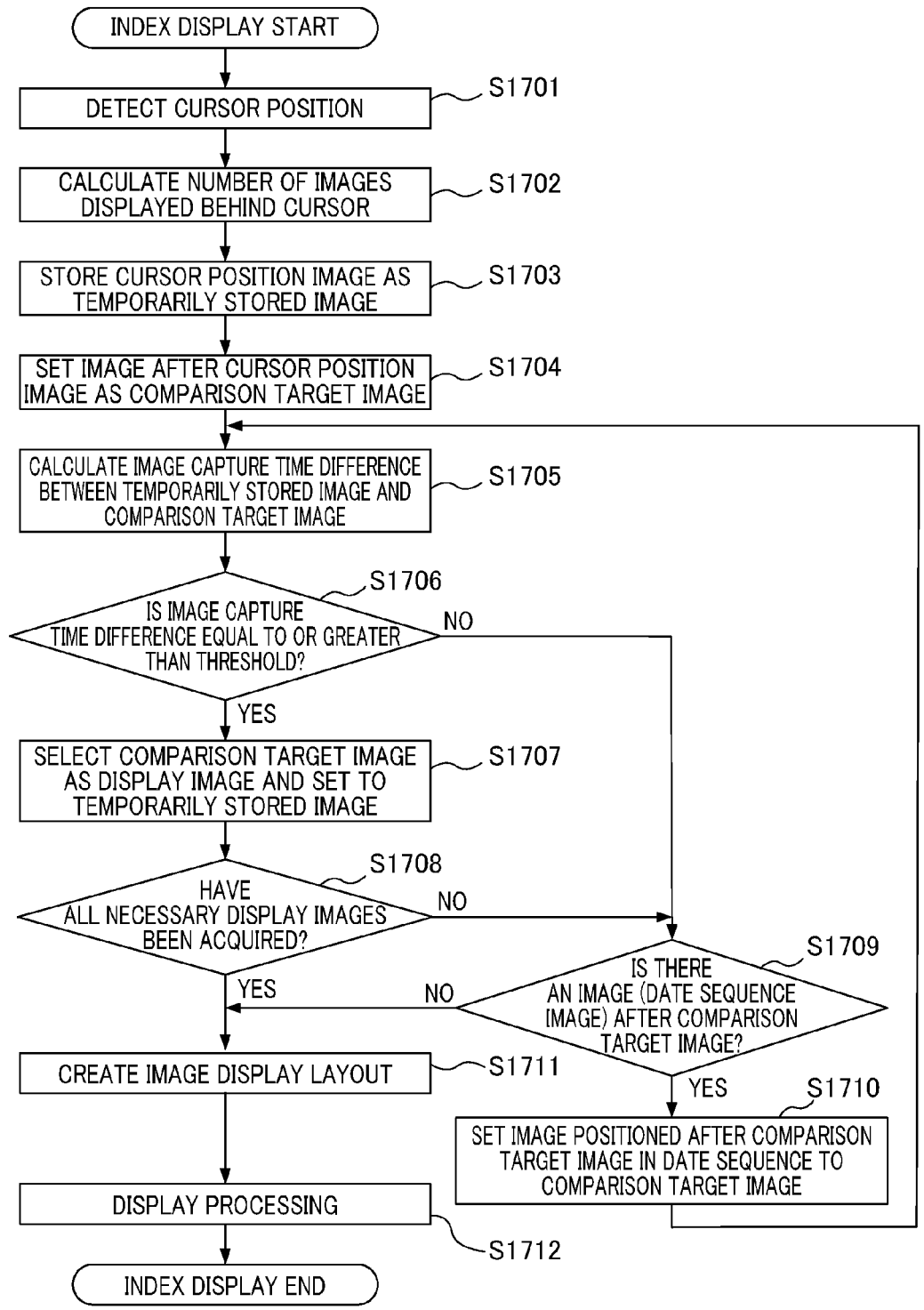

IMAGE PROCESSING APPARATUS AND CONTROL METHOD FOR IMAGE PROCESSING APPARATUS

BACKGROUND OF THE INVENTION

1. Field of the Invention

The present invention relates to an image processing apparatus that displays reduced images (hereinbelow, referred to as "thumbnail images") representing each image when browsing images and that can display an index display, and a control method for the image processing apparatus.

2. Description of the Related Art

Image browsing apparatuses that display images formatted using JPEG (Joint Photographic Experts Group) and the like on personal computers and television devices and provide audio-visuals of an image to a user are becoming widespread. Such image processing apparatuses are called image viewers or image browsing devices. An image browsing device is generally provided with an index display function, displays a thumbnail image of each image arranged in plurality on one screen, and provides the user with an image selection interface. This index display function has the advantage that searching for a desired image is facilitated because a user can browse a plurality of images simultaneously and can actually confirm the image content.

In addition, in order to improve the search performance for a large number of images, technology has been proposed in which a user selects thumbnail images that are to be displayed on one screen by using, for example, the image capture times for each of the image, and the selected images are displayed as representative images (refer, for example, to Japanese Patent Laid-Open No. 2008-269490). In this technology, the images used in the index display are grouped by using the image capture time and the similarities between images (color, composition and the like), and a representative image for each group is displayed in an index display. Thereby, in the index display state, the number of operations the user must perform until the desired image is viewed can be reduced.

The index display function can search for a desired image while the user browses images, and on this point, it is superior to other image search functions. However, it is disadvantageous on the point that, in the case in which the desired image is arranged at a location distantly separated from the screen (index screen) in the current display, cost and labor (time, number of operations) are incurred in a search until a desired image is found. For example, in an image browsing apparatus having an index display function, assume a case in which twenty thumbnail images are displayed in one screen. In this image browsing apparatus, in the case in which 1000 images are browsed, 50 operations must be carried out even when a page skip function is used to move from the first to the last image. Note that a "page skip function" denotes a function that simultaneously updates all the images in one screen (20 images in the present example). In the technology that is disclosed in Japanese Laid Open Patent Application, Publication No. 2008-269490, the effect is obtained that the movement between a large number of images can be speeded up by displaying only representative images in the index display state. However, there is a problem in that the user cannot indicate an index for selecting the representative image that is displayed. Originally, there is a condition in which, in the case in which the user searches for images at a higher speed or the case in which the user wishes to search for images in more detail or the like, search conditions and the like that are appropriate for each situation cannot be provided.

It is an object of the present invention to provide an image processing apparatus that can efficiently carry out image search processing in an index display in a short time, and a control method for an image processing apparatus.

SUMMARY OF THE INVENTION

The apparatus according to the present invention is an image processing apparatus having a function that resolves the above-described situation, acquires a respective image capture time for each of a plurality of images, and displays an index display of showing a portion of the images in image capture time sequence using reduced size images (reduced images). The apparatus being provided with a time difference calculating device that calculates the image capture time differences between images based on the information about the image capture times for each of the images, a display determination device that selects images to be displayed in the index display as reduced images by comparing the image capture time differences calculated by the time difference calculating device with a set threshold, and a display processing device that, using reduced images, displays an index display of each image selected by the display determination device according to their image capture times.

According to the present invention, in an index display, a user can carry out image search processing in a short time and efficiently.

Further features of the present invention will become apparent from the following description of exemplary embodiments (with reference to the attached drawings).

BRIEF DESCRIPTION OF THE DRAWINGS

FIG. 6 is a drawing for explaining an example of the transition of the screen image when a page jump function is used.

FIG. 14 is a flowchart showing an example of the procedure for processing in which an index display image is created in a third embodiment.

DESCRIPTION OF THE EMBODIMENTS

Below, preferred embodiments of the present invention will be explained in detail with reference to the attached figures.

Figure 1:
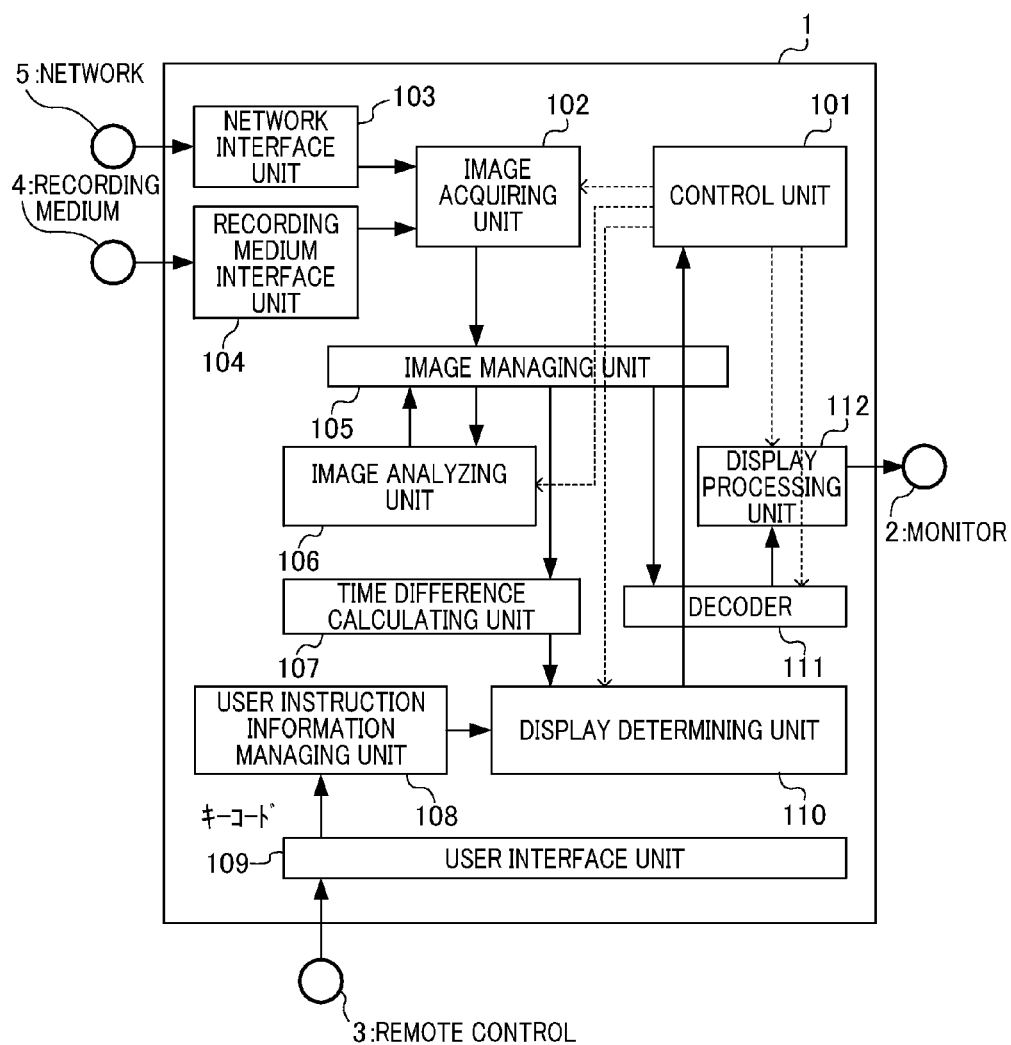
FIG. 1 is a drawing that shows the structure of an image processing apparatus according to an embodiment of the present invention.

FIG. 1 shows an example of the structure of an image browsing apparatus that serves as an image processing apparatus. Note that FIG. 1 also shows the connection relationships between the equipment and the apparatus and the like that are used along with the image browsing apparatus 1, and in the figure, these connection relationships are schematically shown by a circular mark.

First, an outline of the image browsing apparatus 1 will be explained. The image browsing apparatus 1 includes a function that presents a still image or a video image to the user. The image that is created by this image browsing apparatus 1 for presentation to the user is displayed in a monitor 2 that is connected to the image browsing apparatus 1. A digital television apparatus is an example of an apparatus in which the image browsing apparatus 1 and the monitor 2 are integrally formed. Specifically, the embodiment of the present invention is not limited to a structure in which the image browsing apparatus 1 and the monitor 2 are normally separated. In addition, the operation of the image browsing apparatus 1 by the user are carried out by using any type of operation instruction device such as the operation buttons and switches and the like of the remote control 3. The user can use the remote control 3 provide instructions for the control for switching the display of images, the enlarging and reducing process for images, and the activation or termination of the image browsing apparatus 1.

A still image or a video image is provided for display to the image browsing apparatus 1 from a recording medium 4 or via a network 5. Examples of a recording medium 4 include SD cards (Secure Digital cards), CF (Compact Flash), and a hard disc and the like. In addition, examples of images being acquired from a network 5 include internet online albums and DMS (Digital Media Server) that conforms to DLNA (Digital Living Network Alliance).

Next, the internal configuration of the image browsing apparatus 1 will be explained in detail. Note that in FIG. 1, the solid arrows indicate the flow of data, and the broken arrows indicate the flow of control signals. The control unit 101, which controls the image browsing apparatus 1 overall, directs, for example, for the control of the selection process for the displayed images and the image display format change process and the like. Note that phrase "image display format change process" denotes a process in which the display position and display quality of the images, and the display magnification and the like of the images are changed.

The image capture unit 102 captures image data via a recording medium interface unit 104, to be described below, from a recording medium 4 according to an image capture request signal that is issued by the control unit 101, or acquires image data via a network interface unit 103 from a network 5. The image data acquired by the image acquiring unit 102 is not limited to still pictures, but also includes video. In addition, the image format is not particularly limited, and images in all formats are acquired.

The network interface unit 103 acquires image data that has been specified by the image acquiring unit 102 via a network 5. The network interface unit 103 includes a protocol processing function for carrying out HTTP (Hyper Text Transfer Protocol) communication and the like, and an interface function for acquiring contents in DMS and contents online. Reproductive (copying) processing is carried out by the network interface unit 103 on the images that have been acquired via the network 5, and these images are sent to the image acquiring unit 102.

The medium interface unit 104 acquires image data specified by the image acquiring unit 102 from among the image data that has been stored on the recording medium 4. The recording interface 104 includes, for example, a control function for a USB (Universal Serial Bus) or an SATA (Serial Advanced Technology Attachment). The image data that has been acquired from the recording medium 4 is sent to the image acquiring unit 102.

The image managing unit 105 manages the images that have been acquired by the image acquiring unit 102. In the image managing unit 105, images are arranged based on various types of information that have been obtained by an image analysis unit 106, which will be explained below, and the arrangement information is managed. Note that the expression "various types of information" denotes the image capture time information for the images, the image capture location information for the images, the resolution information for the images, and information about the photographic apparatus that captured the images and the like. In addition, the expression "arrangement of images" means that an image group that is managed by the image managing unit 105 is arranged in a time sequence according to the image capture time and the like.

The image analysis unit 106 carries out analysis processing of the images that are managed by the image managing unit 105 when a start instruction for image analysis processing issued by the control unit 101 has been received. Specifically, the image analysis unit 106 extracts various types of information that has been appended to the images and specifies the image capture times of the images and the like. For example, in an image that has been created by a digital camera, Exif (Exchange image-file format) tags, including the image capture time information, the image capture location information, and information about the photographic apparatus and the like, are provided as appended information. The image analysis unit 106 includes an Exif tag analysis function that is appended, for example, to a JPEG image, and extracts the information in the Exif. The image managing unit 105 arranges the images by using the information that has been extracted by the image analysis unit 106, and carries out processing in which the arranged information is managed. In addition, the image managing unit 105 carries out the management of the image information that has been extracted by the image analysis unit 106.

The time difference calculating unit 107 uses the image information that is managed by the image managing unit 105, and calculates the image capture time difference between the arranged images. For example, in the case in which image An image B, and image C are arranged in an image capture time sequence, the time difference calculating unit 107 calculates the image capture time difference between image A and image B, and the image capture time difference between image B and image C. Or the image capture time difference between image B and image C may be calculated based on the image capture time of image A. The time difference calculating unit 107 sends the calculated information to the display determining unit 110, which will be described below.

The user instruction information managing unit 108 stores and manages instruction information that has been input via a user interface unit 109, which will be described below, while a user operates the remote control 3. The information that is managed by the user instruction information control unit 108 includes time difference threshold information and the like, and this is information that is necessary for selecting images for carrying out an index display that is executed by a display processing unit 112, which will be described below. Note that the expression "time difference threshold information" denotes information related to a threshold for comparing the image capture time differences between images that are managed. The input information that has been indicated by a user operation is not limited to a mode in which the time difference threshold is directly indicated in a time format, and thus, the user instruction information managing unit 108 also simultaneously manages tables for converting instruction information from the user and a time threshold. Below, this table is referred to as a "time difference threshold conversion table". In addition, the time difference threshold information that is managed is provided to the display determining unit 110, which will be described below, by the user instruction information managing unit 108.

The user interface unit 109 accepts key codes that are input from the remote control 3 during user operation, converts these codes to instruction signals, and sends the instruction signals to circuit units at suitable times. Examples of the data that is transmitted to the user instruction information managing unit 108 include the time difference threshold information described above.

The display determining unit 110 receives instructions from the control unit 101, and carries out determination processing to determine the images that are to be displayed in the monitor 2. Specifically, the display determining unit 110 compares the time difference threshold information from the user instruction information managing unit 108 and the image capture time differences between images that have been calculated by the time difference calculating unit 107 and sends the results of the comparison to the control unit 101. Note that a specific example of the comparison results is a sign (positive or negative) of the difference between the time difference threshold information indicated by a user and the image capture time difference between images that has been calculated by the time difference calculating unit 107, or zero.

A decoder 11 acquires the image data that is managed by the image managing unit 105, and appropriately converts the image data to a format that can be displayed. For example, processing in which a JPEG image is converted to a bit map format and the like is carried out. In addition, in the case of an AVCHD (Advanced Video Codec High Definition) image, the image data for one frame is extracted from the video data, and processing is carried out in which a still image that is to be used in the index display is created. The decoder 111 carries out image resolution conversion according to the instructions of the control unit 101, and also carries out conversion processing to convert image data to a display resolution.

The display processing unit 112 outputs a display to the monitor 2 based on instructions from the control unit 101. Specifically, the display processing unit 112 acquires the image results for display from the decoder 111, and after creating a layout for the index display, outputs an image signal to the monitor 2. Thereby, index display is carried out on the monitor 2 (the details thereof will be explained below).

Note that the image browsing apparatus 1 is not limited to processing JPEG image data, but it can also similarly process MPEG (Moving Picture Experts Group) image data.

Figure 2A:
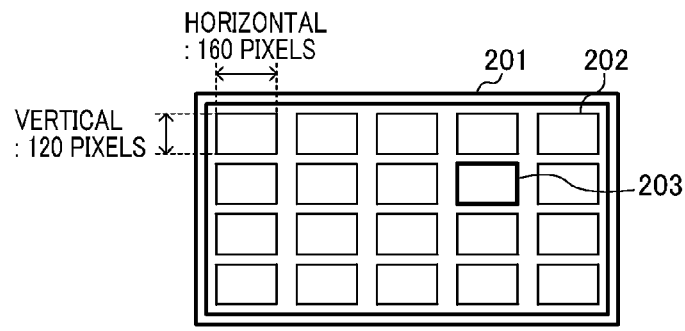
FIGS. 2A-C are drawings that disclose examples of processing illustrated on an index display screen.

Next, the index display function of the image browsing apparatus 1 will be explained in detail. FIGS. 2A-E are drawings that disclose examples of processing illustrated on an index display screen 201. The index display screen 201 is displayed on the monitor 2 (FIG. 2A). A plurality of thumbnail images 202 is displayed on the index display screen 201, and a cursor 203 (refer to the thick lines) is also displayed that points to a thumbnail image 202 that is selected according to the user operation. Note that generally in the case of photography using a digital camera, the thumbnail images 202 are appended as a reduced image (reduced in size) within a still image. A reduced image is created by carrying out extraction and resolution conversion processing of the image by the decoder 111 in FIG. 1 for still images and video images for which a reduced image has not been appended in an image. In addition, the resolution of the thumbnail image 202 that is appended to the photograph image of a digital camera is generally 120 pixels vertically and 160 pixels horizontally.

Figure 2B:
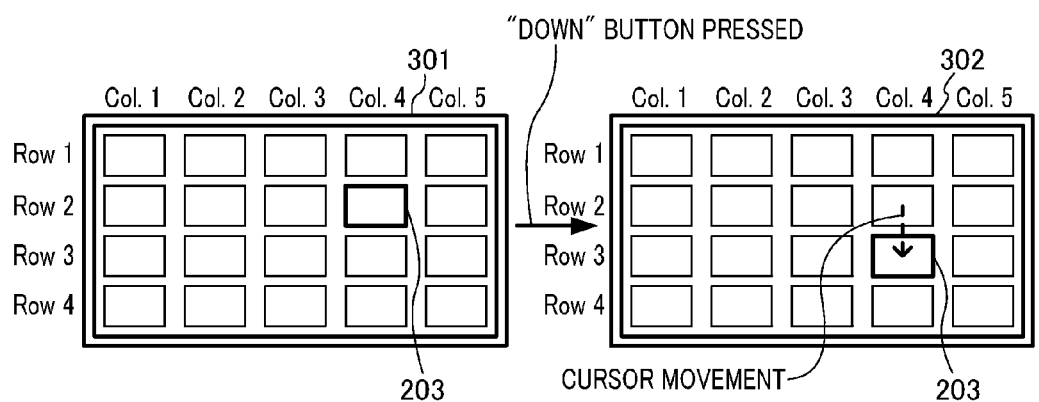

The display processing unit 112, which executes the index display, includes a function that moves the curser 203 according to the operation of the remote control by the user, and selects the desired thumbnail image 202. FIG. 2B is a schematic drawing for explaining the movement of the curser due to a user's operation, and shows a screen 301 that shows the state before the cursor is moved and a screen 302 shows the state after the cursor has been moved following a user operation. The screen 301 shows a state in which the cursor 203 has been positioned at the second row, fourth column. Here, when the user presses a "down" button key (not illustrated) on the remote control 3, the cursor 203 moves downward by one image, and as shown in the screen 302, arrives at a position in the third row, fourth column. Note that generally, the remote control 3 is provided with operating buttons for four directions: up, down, left, and right. Thus, operations are possible that enable moving the position of the cursor 203 freely in any direction. In addition, after the cursor 203 has arrived at the top edge or the bottom edge of the screen, the images are scrolled, and new thumbnail images are displayed on the screen. In addition, a function that updates all thumbnail images on a screen at one time, which is known as a page switching function, is known.

In the index display function, the cursor 203 is moved on the screen according to a user operation, and the desired image can be decided by selecting an image. In the selection processing for an image, the curser 203 is moved in the index display state in which plural thumbnail images are arranged, and an image can be viewed after selecting the desired image by a user operation.

Figure 2C:
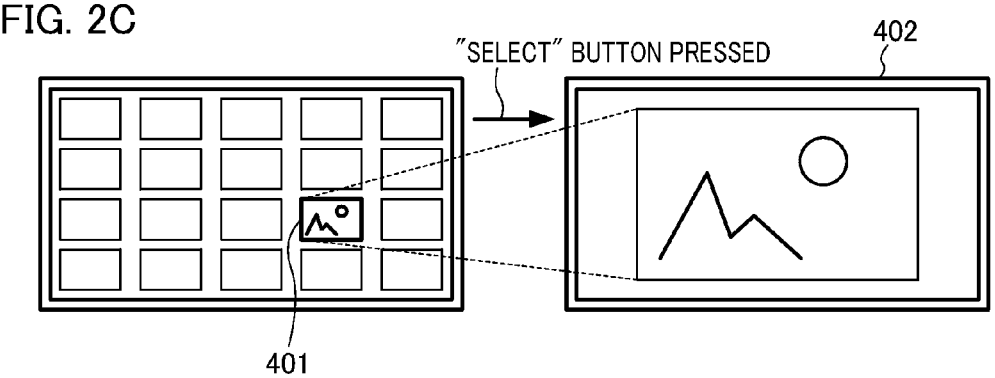

FIG. 2C is a drawing for explaining an example of a transition from the index display state to the full-screen display state for processing after the cursor movement and up to viewing an image. For example, a condition is assumed in which, in the index display state, the user desires to view image 401. At this time, in a state in which the cursor is at the position of image 401 and this image is selected, the user presses a "select" button (not illustrated) of a remote control 3. As shown in screen 402, the selected image 401 is displayed as an enlarged image on substantially the entire screen. Note that the remote control 3 is provided with an operation button for shifting from a state in which an enlarged image 401 is displayed in the screen 402 to the original index display state.

Figure 3:
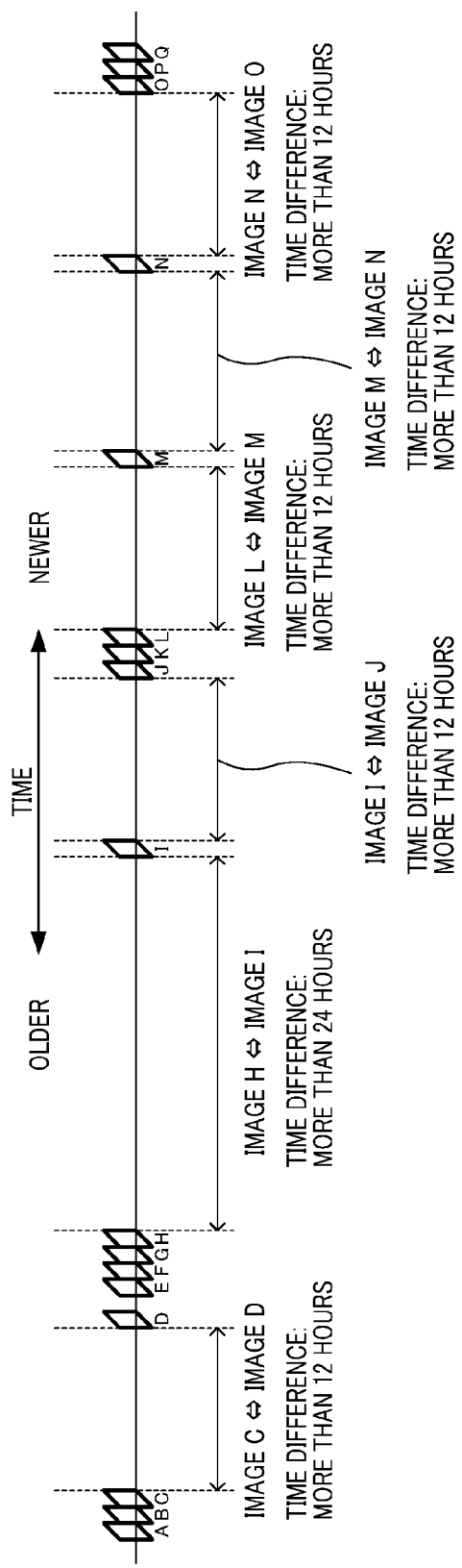
FIG. 3 is a drawing that illustrates an image data group that is used during an index display image selection and image display.

Below, the index display image selection and the image display processing that use the image capture time difference will be explained. First, the image data used during the index display image selection and the image display is shown. FIG. 3 is a drawing that schematically shows the index display image selection and the image data group that is used during image display. In this figure, the time axis is set in the left-to-right direction, and this means that the time is more recent progressing toward the right, that is, the time approaches the present time. In addition, rectangles having appended thereto letters of the alphabet from A to Q represent individual images. Each of the images is shown distributed along the direction of the time axis according to their respective image capture times. Specifically, image A shows the image having the oldest image capture time, and image Q shows the image that was photographed most recently. In addition, in FIG. 3, the longer length of the gap between the rectangles that indicate images shows a larger amount of the image capture time difference. For example, the gap between image C and image D shows that the time difference is more than 12 hours, and the gap between image H and image I shows that the time difference is more than 24 hours. In addition, as shown between image A and image B, and image B and image C, FIG. 3 schematically shows that images having a narrow gap there between have close the image capture times. In the illustrated examples, this means that the there is a high probability that the image group from image A to image C and the image group from image D to image H are respectively photographing the same scene.

Figure 4:
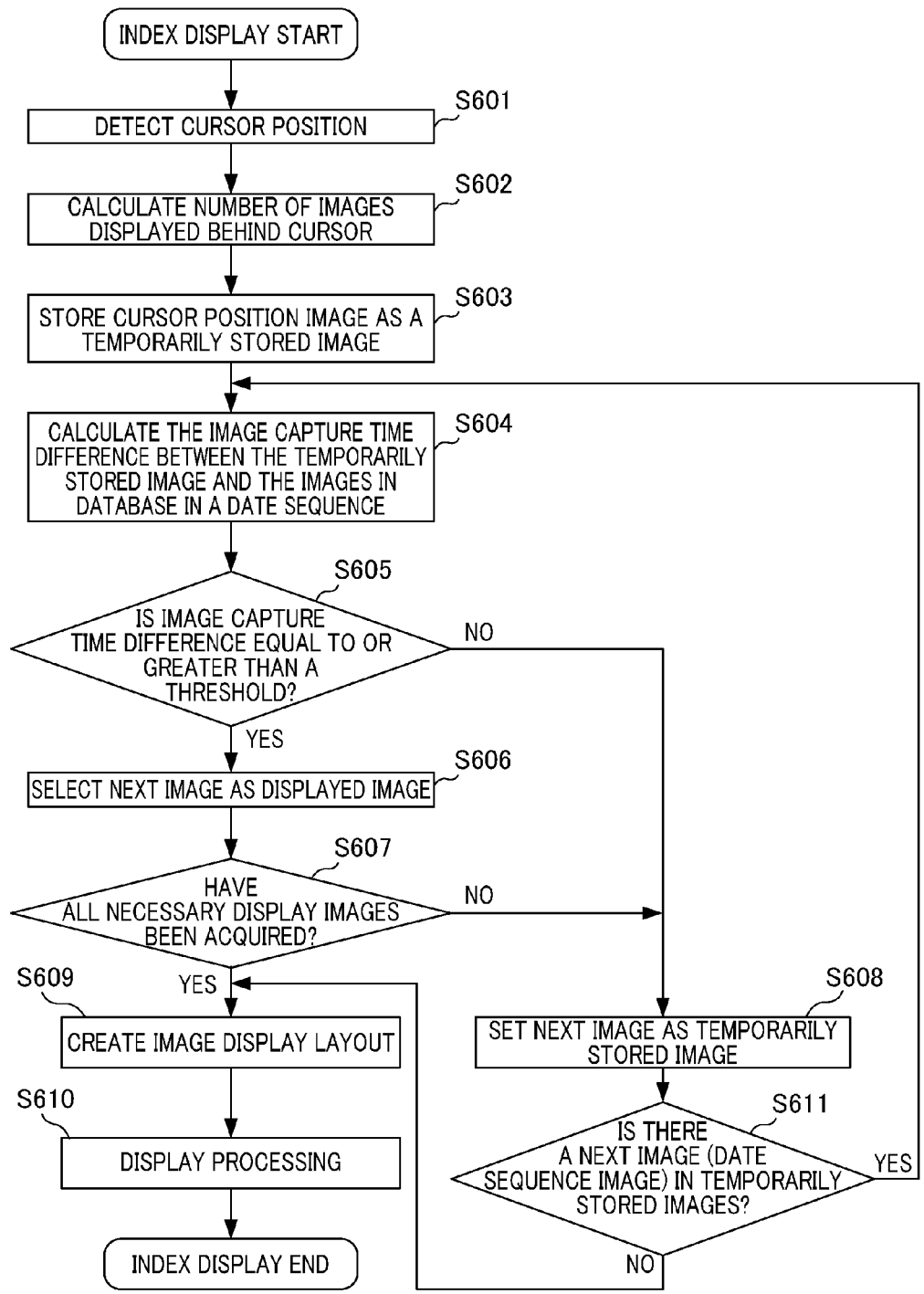
FIG. 4 is a flowchart that shows an example of the procedure for processing in which an index display image is created.

Next, the process in which the time difference for the image capture time of the images is used to select the displayed image will be explained, up to the completion of the index display. FIG. 4 is a flowchart that shows an example of the procedure for the process that creates an index display image. Here, an explanation will be provided assuming, as an initial condition, the case in which the cursor position, in the index display state, is at the leftmost upper edge (column 1, row 1) of the screen. This means that this cursor position shows the image having the oldest image capture time in one screen of the index display. Therefore, among the image groups displayed in one screen, the position at row 4, column 5 is the position at which an image having an image capture time closest to the present time is displayed.

First, the detection process of the cursor position is carried out by the control unit 101 in FIG. 1 (S601). Here, the cursor position is at the leftmost upper end of the screen, but depending on the state, as described above, the cursor position is arbitrary, and cursor can be moved to various positions in the index display.

Next, processing is carried out in which the number of displayed images newer in time is displayed in back of the cursor position is calculated (S602). Specifically, the image managing unit 105 shown in FIG. 1 calculates how many images are to be displayed in back of the cursor position in one screen. Note that the expression "farther back than the cursor position" is an expression for the case in which, in the index display screen shown in FIG. 1, the position at row 1, column 1 is set as image display position most toward the front, and the position at row 4, column 5, is set to the image display position most toward the back. Therefore, in the case in which the cursor is present at the position at row 4, column 4, only the position of for row 4, column 5, is behind the cursor position. For example, in the index display state, as shown in FIGS. 2A-C, when a total of 20 images in four rows and five columns are displayed in one screen, there are 19 images that are newer in time than the cursor position. Thus, when an index display is carried out, processing that determines 19 display images becomes necessary. Note that in the case in which a portion of the images, for example, the images present in row 1, are newly inserted in a screen by a scroll process and the like, image selection processing is necessary only for newly displayed images. Note also that at this time, in the case in which there are fewer images managed by the image managing unit 105 than the maximum image number for the index display screen, the flowchart in FIG. 4 ends at the point in time at which the selection process for all managed images has been completed.

Next, processing is carried out that stores the image at the curser position as a temporarily stored image (S603). Here, the control unit 101 that is shown in FIG. 1 stores this image on the recording medium 4 via the recording medium interface unit 104. Subsequently, the selection of the displayed image is implemented by sequentially updating these temporarily stored images.

Next, processing is carried out that calculates the image capture time differences between images (S604). Specifically, the time difference calculating unit 107 in FIG. 1 calculates the image capture time difference between a temporarily stored image that was stored in S603 and the image photographed next after the temporarily stored image among the candidate display images. The term "candidate display image" denotes an image group that is arranged and managed by the image managing unit 105. For example, in FIG. 3, in the case in which an image present at the cursor position is image A, the temporarily stored image becomes image A. In addition, the image having an image capture time next closest to image A becomes image B. Therefore, in S604, the time difference between image A and image B is calculated. Note that the image capture times for each of the images are calculated by analyzing the information that the image analysis unit 106 has appended to this image. The image and the image information that includes the image capture time are managed in a database or the like by the image managing unit 105. The image managing unit 105 manages images in an image capture time sequence by arranging them according to a time series, and the time difference calculating unit 107 calculates the image capture time differences between the arranged images.

Next, the display determining unit 110 determines whether the image capture time difference is equal to or greater than a threshold (S605). Specifically, the display determining unit 110 compares the image capture time difference that has been calculated in S604 and the threshold that has been obtained from the user instruction information managing unit 108, and determines whether the time difference is equal to or greater than the threshold. As a result, in the case in which the image capture time difference is less than the threshold (S605: No), the processing proceeds to S608.

In contrast, in the case in which, in S605, it has been determined that the image capture time difference is equal to or greater than the threshold (S605: Yes), the display determining unit 110 carries out selection such that the next image is set as a display image (S606). Subsequently, the display determining unit 110 determines whether all of the images necessary for the display have been selected (S607). As a result, in the case in which all the images necessary for display have been selected (S607: Yes), the processing proceeds to S609. In contrast, in the case in which all the images necessary for display have not yet been selected (S607: No), the processing proceeds to S608.

In S608, processing that stores the next image as a temporarily stored image is carried out. Specifically, the control unit 101 in FIG. 1 stores the next image on the recording medium 4 via the recording medium interface unit 104.

Here, the processing from S604 to S608 is explained with reference to FIG. 3. In S604, the time difference between image A and image B is calculated, and this time difference and the time difference threshold information are compared in S605. Here, when the user has set a value of 12 hours as the time difference threshold information, because the time difference between image A and image B is less than 12 hours, in S605, it is determined that the time difference is smaller than the threshold. Therefore, the processing proceeds from S605 to S608, and image B, which is the next image, is stored as a temporarily stored image. In S611, which will be explained below, in the case in which it has been determined that a next image among the temporarily stored images is present, the processing again returns to S604, and the time difference between image B, which is the temporarily stored image, and image C, which has the next closest image capture time, is calculated. Because the time difference between image B and image C is smaller than 12 hours, which is the threshold, the processing again returns to S608, and image C is stored as a temporarily stored image. Subsequently, the time difference between image C, which is a temporarily stored image, and image D is calculated by S604. Because the time difference calculated by this process exceeds 12 hours, in S605, it is determined that the time difference is equal to or greater than the threshold, and in S606, image D, which is the next image, is selected as a display image.

In S611 in FIG. 4, processing is carried out in which it is determined whether a next image among the temporarily stored images, which has been updated in S608, is present. This determination process is a process that determines whether, in the image data group that has been arranged in a date sequence, the temporarily stored image is the final image. In the case in which it has been determined that the target image is the final image, the process in which the display images are selected is stopped, and the processing proceeds to S609. In addition, in the case in which it has been determined that a next image among the temporarily stored images is present, the processing returns to S604. In the present embodiment, the above processing is repeated, and all images that are to be displayed in one screen are decided.

In S609, the display processing unit 112 in FIG. 1 creates the image display layout, and then display processing is carried out (S610). Signals for the created image display layout are output to the monitor 2 in FIG. 1, and the index display images are provided to the user.

Due to the above processing, image selection processing using threshold information is carried out. In the explanation of FIG. 4, it was mentioned that behind the cursor position, that is, where the image capture times are more recent, even in the case in which the cursor position is not at the leftmost upper edge of the screen in the index display state, this can be handled by similar processing. For example, when the cursor is positioned in one screen, behind the cursor position, that is, where the image capture times are more recent, the processing in the flowchart that is shown in FIG. 4 can be applied as-is. In addition, in front of the cursor position, that is, where the image capture times are older, the image that has been selected in S604 of the flowchart shown in FIG. 4 is set not to the next image but to the previous image. That is, processing is executed in which the image having an image capture time older than that of the image that is temporarily stored is selected, and the time difference is calculated. In addition to the explanation with reference to FIG. 3, in the case in which the image that is at the cursor position is image I, the image capture time differences for the images behind the cursor position are calculated in sequence from image J, which follows image I. In contrast, the time differences for images in front of the cursor position are calculated in a sequence from image H to the older image capture times. Due to the above processing, the images displayed in the index display screen are selected based on the threshold information for time differences.

Next, from the state in which the image at the cursor position is the image I in FIG. 3, the index display screen image to which image selection process using a threshold has been applied will be explained with reference to FIGS. 5A-D.

Figure 5:
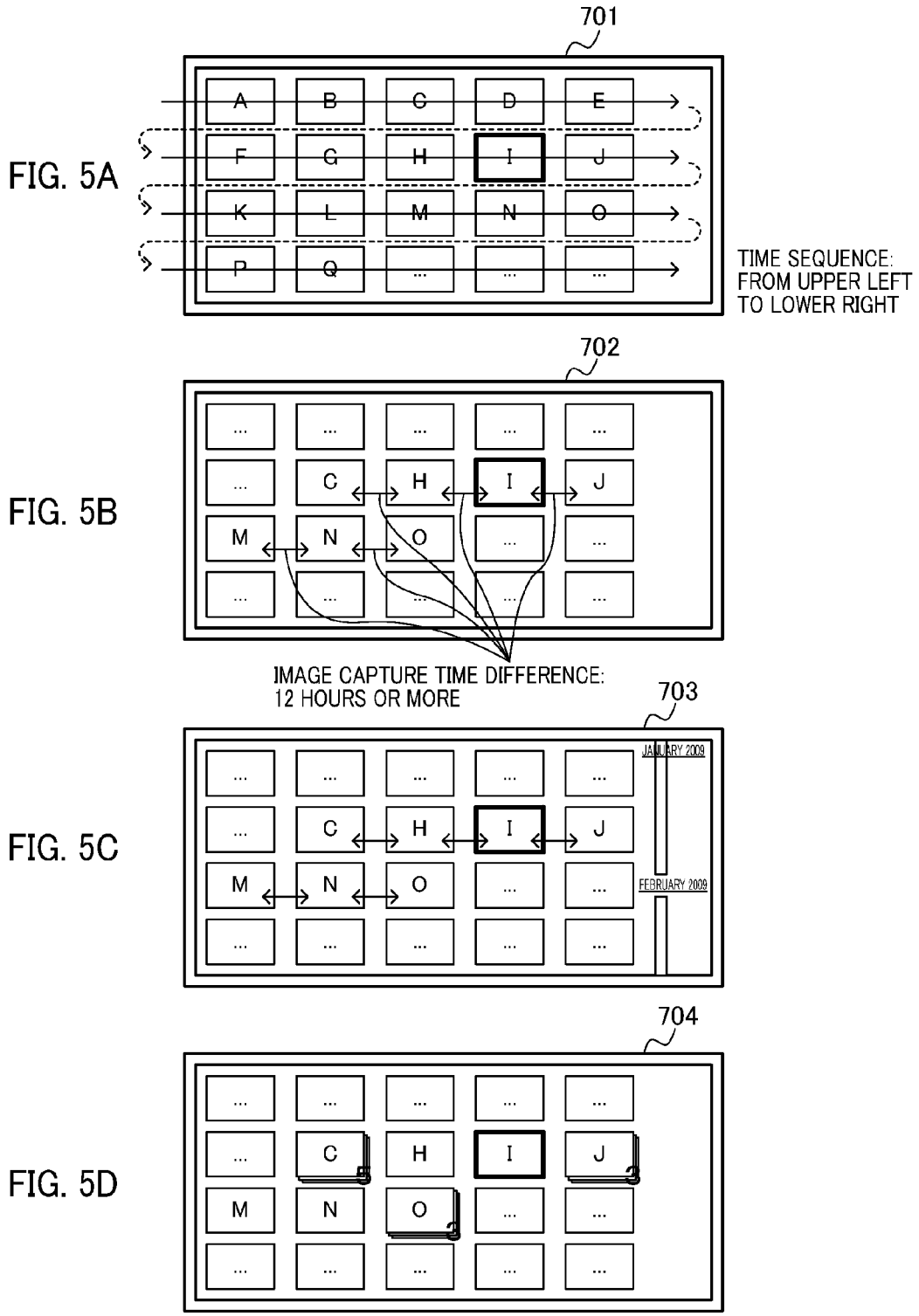
FIGS. 5A-D are drawings for explaining the temporal transition of the index display states using the time differences between images.

FIGS. 5A-D are drawings for explaining the temporal transition of the index display states using the time differences between images. Screen 701 in FIG. 5A illustrates an image for the case in which the image groups shown in FIG. 3 are all displayed in an index display, and screen 702 in FIG. 5B illustrates an image after the image selection process using a threshold has been applied. In screen 701, images having the oldest image capture time are displayed at the leftmost upper edge, and the image capture times are renewed in the sequence shown by the arrow. In addition, the cursor is positioned over image I. Additionally, from the state of screen 701, when the image selection processing using a threshold is applied, the state shown in screen 702 results. Here, it is assumed that the threshold is 12 hours. Based on image I, which is at the cursor position, by applying processing based on the flowchart that is shown in FIG. 4 toward the back and the front, the state shown in screen 702 can be realized. The images shown in screen 702 are all images for which the image capture time differences are equal to or greater than 12 hours. Thus, because a state occurs in which the representative image is selected from an image group for which the image capture time differences are comparatively small, as described above, the time scale that is shown in one screen becomes large. As a result, the overall viewability within one screen increases, the time required until arriving at the desired image due to user operations is reduced, and the search performance is improved. Note that "time scale" denotes, in an image group, the image capture time difference between an image having the oldest image capture time and the image having the newest image capture time.

An example of an index display screen in which the present embodiment has been used is shown in screen 703 of FIG. 5C and screen 704 of FIG. 5D. In screen 703, an example is shown in which the time scale image, which shows the image capture time in the present screen in the index image screen, is displayed at the right side. In the application of the present embodiment, the images that are shown in one screen are changed depending on the selection by a user operation. Images displayed in one screen may be those taken on one day or may have a timescale of one year. Thus, as shown in screen 703, simultaneously displaying a time scale image so that the image capture time of the images in the screen can be easily grasped is effective. Screen 704 illustrates a format that displays whether or not images displayed in an index display are representative images. As shown in screen 704, it is desirable that a graphic display is carried out so that representative images can be clearly distinguished, and a value is displayed that indicates the number of images that constitute the image group to which this representative image belongs. In the example of FIG. 5D, graphics are rendered such that an image C represents an image group consisting of five images. The rendering is displayed such that plural images appear to be overlapping, and shows the total number of images that are included in the image group using a numeral. Thereby, in the index display screen, a user can visually distinguish the number of images that are included in a screen and whether these images are representative images, and thus, the image search performance is increased. Note that a screen may simultaneously use the display formats of screen 703 and screen 704. Of course, in addition to the display of FIG. 5D, a configuration can be used in which the time scale image shown in FIG. 5C is also displayed. In addition, as reference information for each of the images, the image capture time information may be displayed in proximity to each of the thumbnail images.

In the explanation above, a change in the image display state due to a threshold change is displayed in a state in which the cursor position does not change, but even in the case in which the cursor position is changed due to a user operation, the flowchart in FIG. 4 can be used. The transition of the screen image due to a user operation and the display image selection method that uses FIG. 4 will be explained that used FIG. 6 and FIG. 7.

Figure 6:
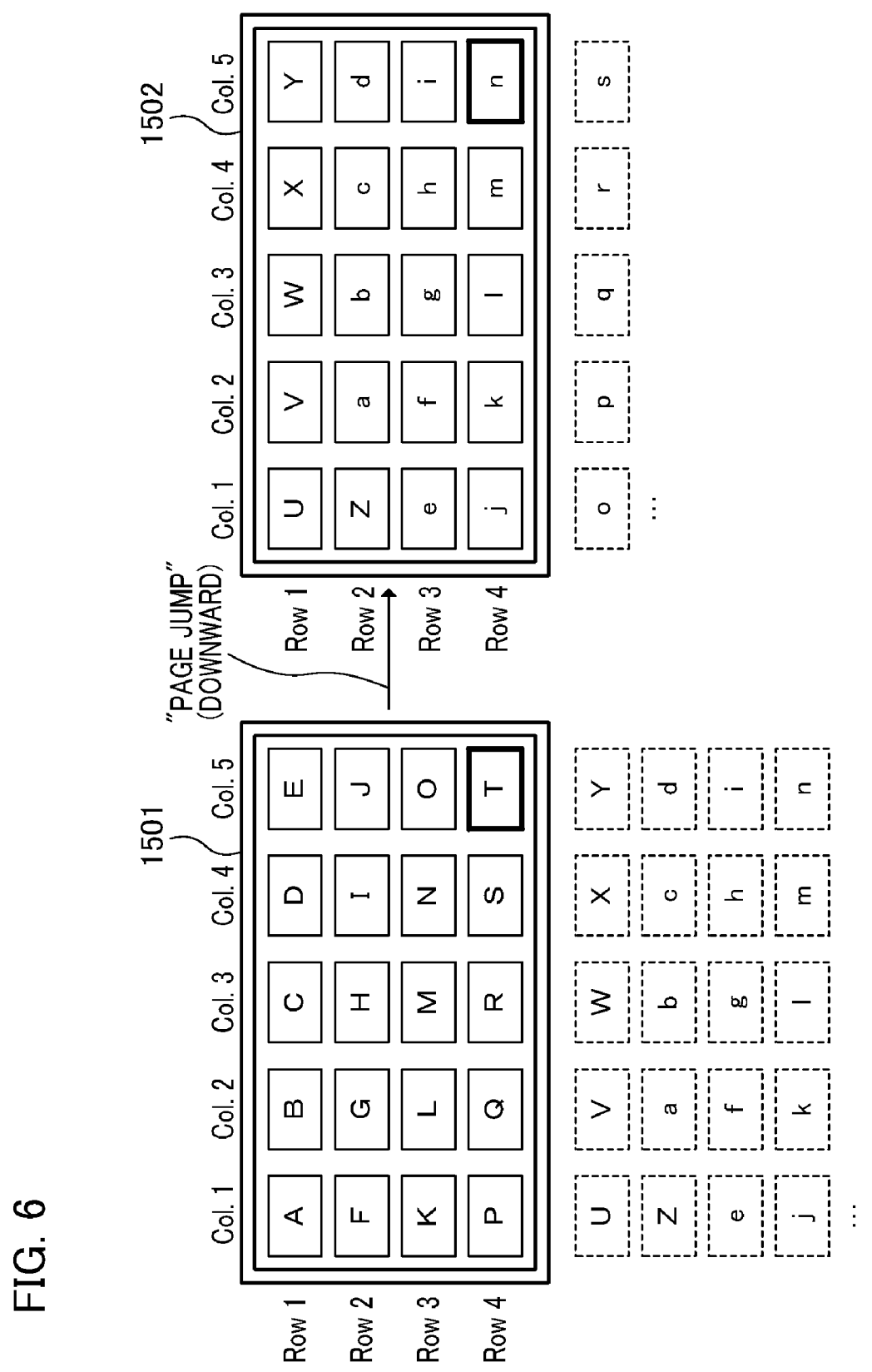

FIG. 6 is a drawing that for explaining an example of the transitions of screen images when using the page jump function, which is one of the functions of an image browsing apparatus that is explained in the present embodiment. Screen 1501 shows the state before transition, and a screen 1502 that shows the state after the page jump. In screen 1501, image A to image T are an image group that is displayed in an image browsing apparatus, and image U to image Z, and furthermore, image a to image n are an image group intended to be displayed after image T. In addition, the cursor is set above the position of image T. When a downward page jump is indicated in the display state of screen 1501 by a user operation, the screen transitions to screen 1502. The displayed image selection at this time is executed by the flowchart in FIG. 4. Here, the threshold for the time differences between images is set to zero. When there has been a page jump instruction, in S602 of FIG. 4, the number of displayed images behind the cursor is calculated. In the example in FIG. 6, because all twenty images in one screen are updated by a page jump, the number of displayed images, including the image at the cursor position, becomes 20. According to the flowchart in FIG. 4, the 20 images from image U to image n are selected as display images, and rendering update processing of the display area is carried out by S609 and S610 in FIG. 4. Due to the above processing, the transition from screen 1501 to screen 1502 in FIG. 6 is executed.

Figure 7:
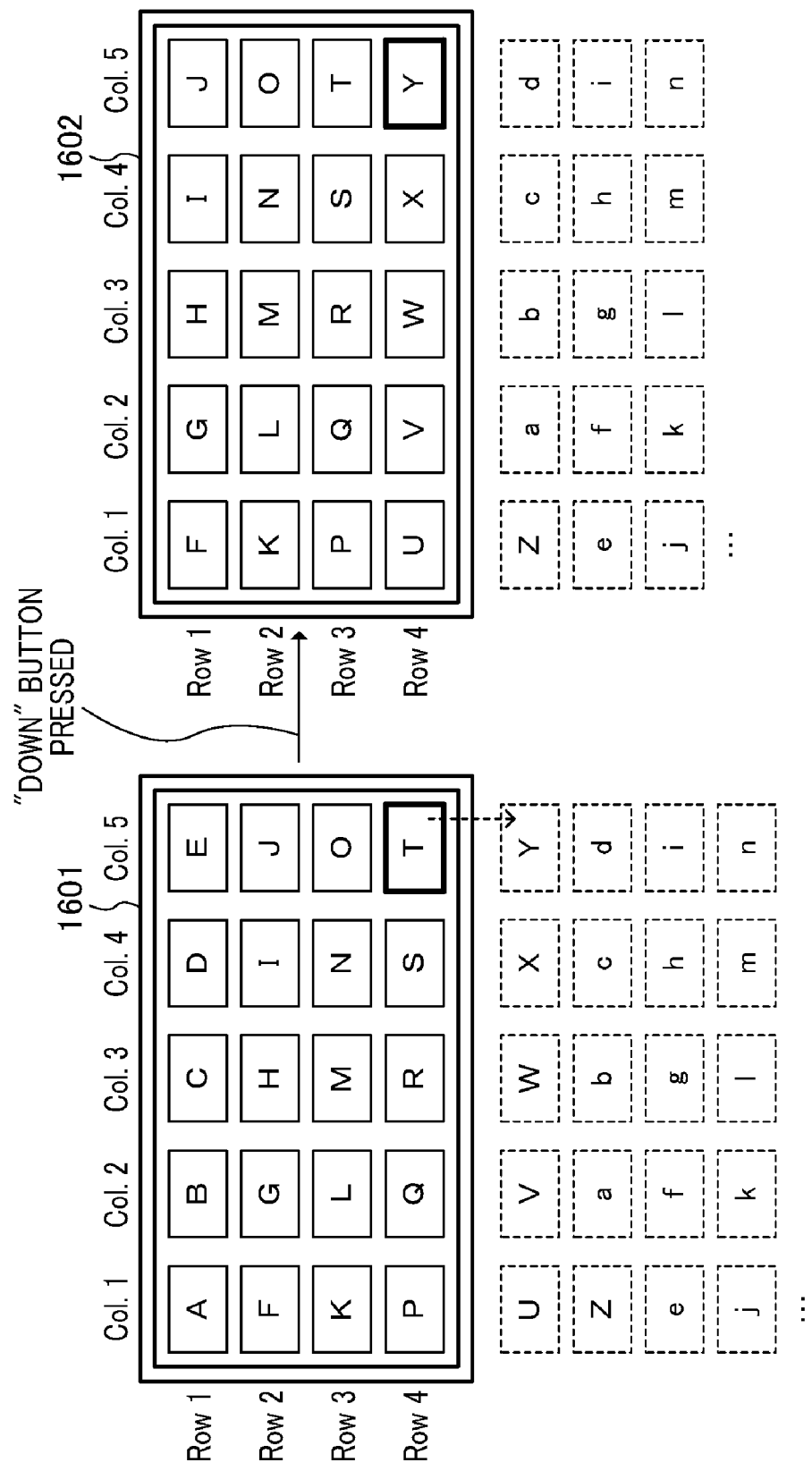
FIG. 7 is a drawing showing the transition of the screen images when a direction key is pressed at a boundary between display areas due to an operation instruction of a user.

FIG. 7 shows an example of the transition of the screen image for the case in which the direction key has been pressed due to an operation instruction of a user at the boundary between display regions. Screen 1601 in FIG. 7 illustrates the state before the transition, and screen 1602 illustrates the state after the down button has been pressed. Note that the image group that is displayed in screen 1601 is identical to the case of the screen 1501 of FIG. 6, but the image group that is displayed in screen 1602 is from image F to image Y. In the case in which the cursor is positioned at image T, one line (5 images in screen 1601) is displayed after being repeatedly shifted upward due to the down button being pressed. Therefore, in the image selection process according to the flowchart in FIG. 4, the number of displayed images following the cursor is set to 5 in S602 of FIG. 4. Subsequently, according to the flowchart in FIG. 4, image U to image Y are selected as new displayed images, and the rendering is updated. The transition from screen 1601 to screen 1602 in FIG. 7 is executed by the above processing.

Figures 8, 9:
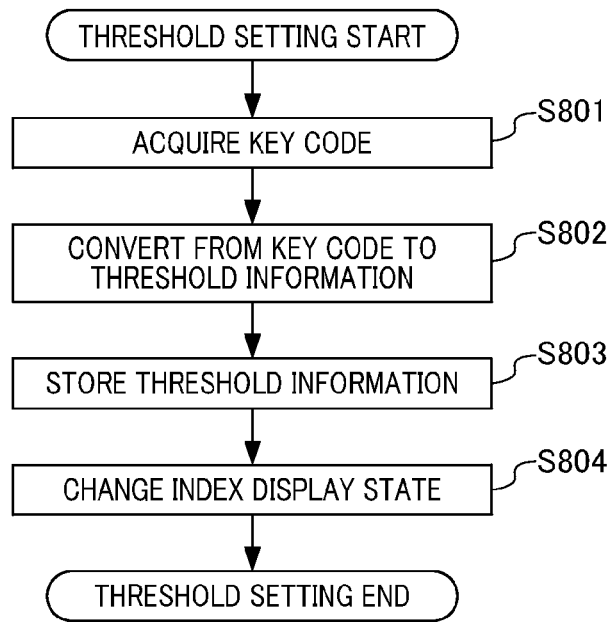
FIG. 8 is a flowchart that shows an example of the procedure for the threshold setting process.
FIG. 9 is a table that shows an example of the time difference threshold managing table used to obtain threshold information.

Next, the process that sets the threshold described above will be explained in detail. FIG. 8 is a flowchart that shows an example of a procedure for a threshold setting process, and shows the process up to updating the time difference threshold information and carrying out the update instruction for the index display screen due to an instruction from the user.

First, processing is carried out that acquires a key code that is input by a user operation (S801). The key code is sent by the operation of the remote control 3 in FIG. 1, and is then transmitted to the user instruction information managing unit 108 via the user interface unit 109. Here, a +button and a −button are defined as buttons (note illustrated) of the remote controller 3 operated by the user. The +button has a function that changes a state from a certain state in a direction that increases a value, while in contrast, the −button has a function that changes a state from a certain state in a direction that decreases a value.

Next, the user instruction information managing unit 108 converts a key code to threshold information (S802). FIG. 9 shows an example of a time difference threshold managing table that is used for obtaining threshold information. This table is used by the user instruction information managing unit 108 to find time difference threshold information from the acquired key code. In the example shown in FIG. 9, 10 stages are set from a time difference of 0 to a time difference of 1 year. In addition, an ID (identification information) is set for each of the time differences, and the ID and the time difference are managed as a pair. For example, zero is set as an initial value for the ID. Specifically, the index display in the initial state is set so that all images are displayed because the time difference threshold is zero.

Here, consider a case in which zero is set as a state value and a key code is acquired from a remote control 3. When the +button is pressed, the state value at the current point in time is incremented by only 1. Because the initial state value is 0, the state value becomes 1. Referring to the time difference conversion table in FIG. 9 using the state value of 1, a time difference of 1 hour, whose ID is 1, is found. Furthermore, when the +button is pressed, the state value becomes 2 due to being incremented. Therefore, the time difference at this time of 6 hours can be calculated based on the time difference threshold conversion table. In contrast, when the −button is pressed, the state value is decremented only by 1. Due to the above operation, from the result of pressing the +button and the −button, new time difference threshold information can be calculated based on the time difference threshold conversion table that is shown in FIG. 9. Note that each of the pressing processes becomes disabled (the state value does not change) when the −button is pressed while the state value is 0 and the case in which the +button is pressed when the state value is 9.

Returning again to FIG. 8, the storage process for the time difference threshold information is carried out (S803). Specifically, the user instruction information managing unit 108 in FIG. 1 saves the time difference threshold information that was acquired in S802. In addition, processing in which the index display state is changed is carried out (S804). Here, the user instruction information managing unit 108 notifies the control unit 101 that the time difference threshold has been changed. Thus, the control unit 101 directs that an index display screen be created by the display processing unit 112 according to this new threshold, and thereby the index display screen is updated.

Figure 10:
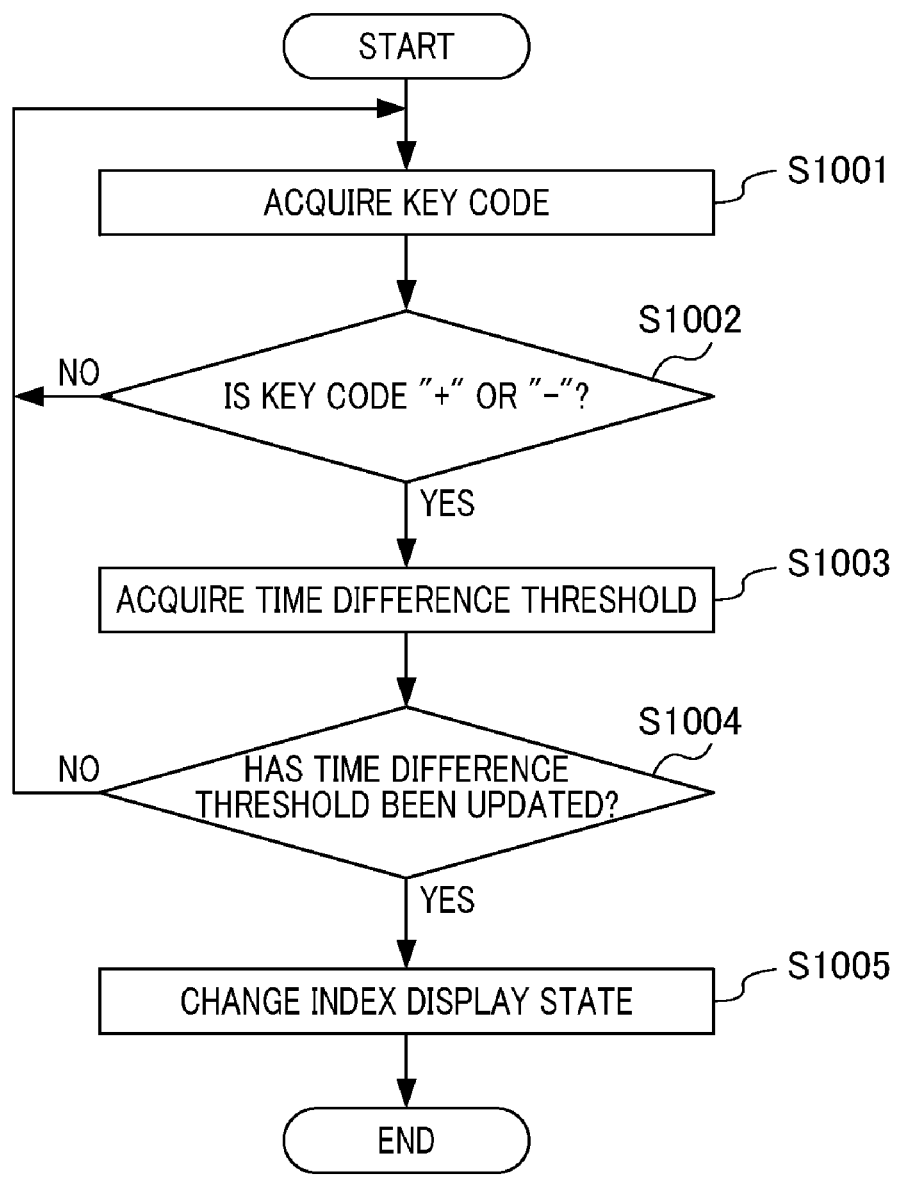
FIG. 10 is a flowchart that shows the update process procedure in an index display state.

Next, an explanation of the flow of the sequence up to the point that the user changes the time difference threshold information and the index display screen is updated. FIG. 10 is a flowchart illustrating the change process sequence of the index display state, and index display is carried out in an initial state.

First, the user instruction information managing unit 108 acquires a key code (S1001). Next, the user instruction information managing unit 108 determines whether this key code is a plus (+) or a minus (−) (S1002). Here, in the case in which the key code is neither "+" or "−" (S1002: No), the processing in step S1001 is carried out again. In contrast, in the case in which the key code is "+" or "−" (S1002: Yes), acquisition processing of a time difference threshold is carried out (S1003). This processing is the same as S802 in FIG. 8. Subsequently, the user instruction information managing unit 108 determines whether the time difference threshold has been updated (S1004). In the case in which the time difference has not been updated (S1004: No), the processing returns to S1001. In contrast, in the case in which the time difference threshold has been updated (S1004: Yes, the index display state is changed (S1005). This processing is similar to the processing in S804 in FIG. 8.

Figure 11:
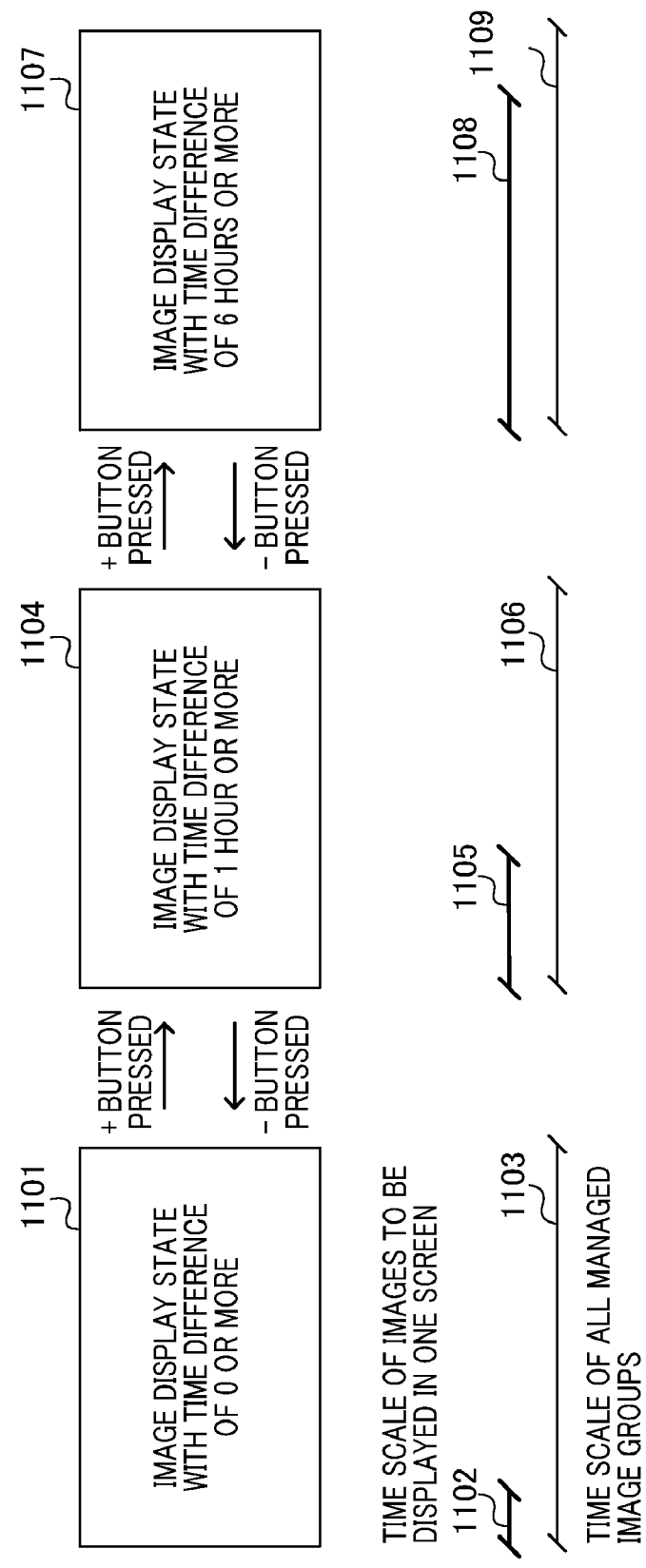
FIG. 11 is a schematic drawing that shows the transition of index display states.

Due to the above procedure, the updating process for the index display state is realized by the user inputting an instruction for changing the time difference threshold. FIG. 11 schematically shows the transition of the index display state due to this process. Screen 1101 shows image display state for the case in which the threshold is zero; screen 1104 shows the image display state for the case in which the threshold is set to 1 hour; and screen 1107 shows the image display state for the case in which the threshold is 6 hours. Specifically, in screen 1101, the time difference threshold is zero, and all of the images are displayed. The segment shown by reference numeral 1102 shows the time scale of image groups that are managed by the image browsing apparatus 1. In addition, the segment shown by reference numeral 1102 shows the time scale for an image group that is displayed in screen 1101. As can be understood by comparing the respective time scales shown by reference numerals 1103 and 1102, in the case in which the time difference threshold is zero, only images in a portion of the time scale among all image groups are displayed.

Next, in the display state of screen 1101, the transition result for the case in which the +button of the remote control 3 has been pressed by a user operation is shown in screen 1104. In this case, because the time difference threshold is set to 1 hour, images having a time difference exceeding 1 hour are displayed in the screen. The segment that is shown by reference numeral 1105 schematically shows the time scale for images that are displayed on one screen, and as can be understood by comparing the time scales (refer to reference numeral 1106) of all managed images, an image group having a wider range than the state in screen 1101 is displayed in one screen.

Furthermore, in the display state in screen 1104, when the +button of the remote control 3 is pressed, the state transitions to screen 1107. In screen 1107, only images having a time difference of 6 hours or greater are displayed. As shown by the segment of reference numeral 1108, it can be understood that the time scale for images that are displayed in one screen occupies a larger time interval in comparison to the time scale (refer to reference numeral 1109) for all images that are managed. Note that the transition between time scales for each of the images can be transitioned together by operating the buttons of the remote control 3, and according to the operating instructions of the user, the display images in one screen can be changed by an arbitrary time scale.

Due to this series of processes, the user can freely control the time scale. For example, in the case in which the user confirms that an image is at a location that is separated in time from the present image, a change can be carried out such that the time scale becomes larger. As a result, in an index display, the time interval, which can be changed by cursor movement, can be increased, the search time until the desired image is obtained is reduced, and the search performance thereby can be improved. In addition, after moving the cursor when the time scale has been made large, the user can carry out in detail an image search in proximity to a desired scene by making the time scale small.

Note that in the embodiment described above, a configuration in which the user can freely control the time scale by operating the remote control was explained. At this time, preferably images that correspond to the time scale that is schematically shown in FIG. 11 are displayed simultaneously with the index display screen. By carrying out the display in this manner, the user can intuitively grasp what range is displayed by what size of time scale among the time scales for all images that are managed. In addition, in the case in which the displayed time scale image is configured as a user interface, direct control is possible. For example, in the case of a display apparatus that allows touch panel operation, the user can freely control the displayed dates and the like using the time scale by directly touching the time scale image with a finger.

As explained above, according to the first embodiment, the user can effectively carry out image search process in an index display in a short time.

In addition, because of having a function by which the user can arbitrarily indicate a threshold and a determination reference value associated with the time difference between images, the time scale of images that are displayed in one screen can be freely changed. Thereby, an operation can be realized in which, in the case in which the transition between images is fast, the time scale is large, and in the case in which the precision of the transition between images is should be high, the time scale is made small, and an implementation in which an image search is fast and precise can be implemented.

Note that images photographed by using one photographic apparatus were the object in the above explanation, but this is not limiting. In the case in which images that have been photographed by a plurality of photographic apparatuses are mixed during index display, the time difference between images may be calculated without distinguishing the photographic apparatus to create the index display image. For example, assume a case in which images A, B, and C are images photographed by a first camera, and images a, b, and c are images photographed by a second camera. When these images are arranged in an image capture time sequence starting from the oldest image, the images are arranged in the order A, a, B, b, c, and C. In the case in which it has been determined that, according to the setting of the threshold, images A, a, and B are close, and images b, c, and C are close, in the index display, image A is displayed as a representative image of a and B, and at their right, image b is displayed as a representative image for images b, c, and C.

In a state in which images that have been photographed by a plurality of photographic apparatuses are mixed is not limited to the case in which an index display is implemented or the case in which a plurality of photographic apparatuses are used in separate locations. For example, in the case in which the image capture time and the image capture location for an image photographed by a first camera and an image photographed by a second camera are close, preferably images for carrying out the index display are selected without distinguishing the photographic apparatuses. Thereby, a reduction of the search performance caused by redundant images being displayed in the index display can be prevented. Note that this embodiment does not need to be applied to all images that are managed by the image managing apparatus 105 in FIG. 1. This embodiment may be applied only to a portion of the image groups that are managed by the image managing unit 105.

Next, a second embodiment of the present invention will be explained. The second embodiment shows an example in which, in the case in which images that have been photographed by a plurality of cameras are mixed during index display, the index display image is created by calculating the time difference of the images for each photographic apparatus. Note that the configuration of the image browsing apparatus for realizing the present embodiment, the processing sequence that determines the images to be used in the index display by using the time difference between each of the images, and the setting process for time difference threshold information by the user are the same as those in the first embodiment, and thus further redundant explanation thereof will be omitted. In the present embodiment, the image analysis unit 106 calculates the image capture time of images for each photographic apparatus and the time difference calculating unit 107 calculates the time difference for each of the images for each photographic apparatus.

Figure 12:
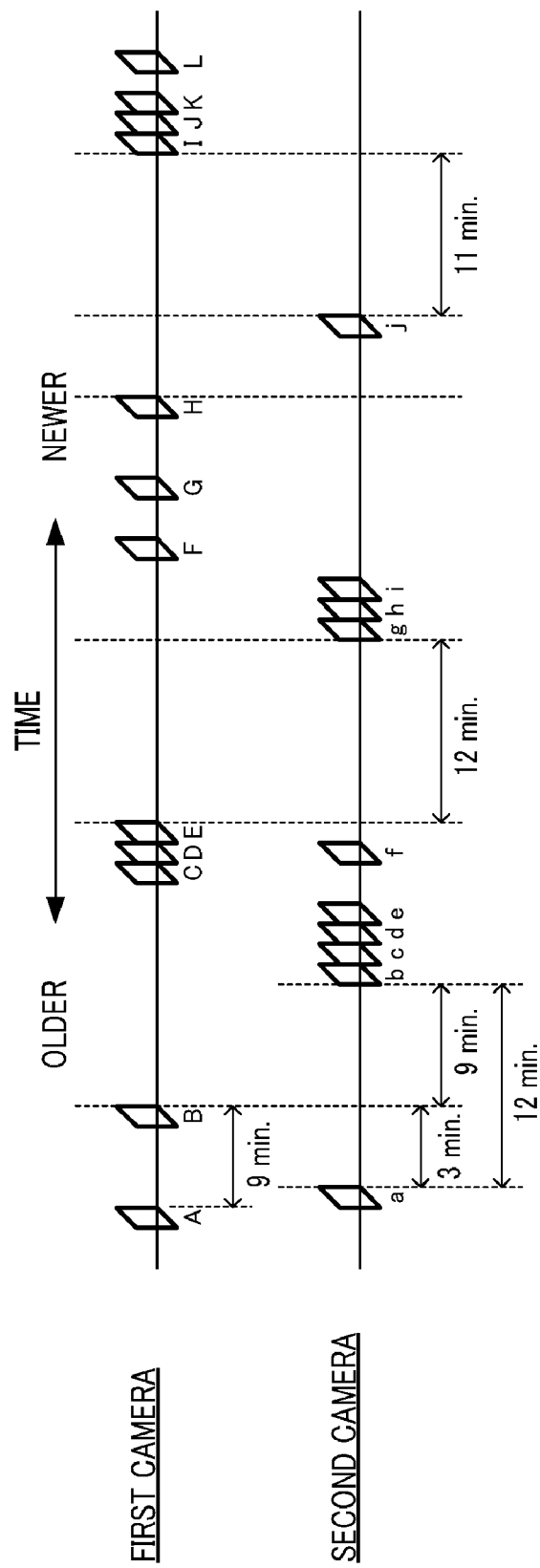
FIG. 12 is a drawing that illustrates an image data group used during index display image selection and image display in a second embodiment.

First, the selection of the index display images and the image data that is used during image display will be explained. FIG. 12 schematically shows the distribution of images for which the time is shown on the horizontal axis and the image capture times for each of the images. The more recent image capture times are toward the right on the horizontal axis. In addition, rectangles in the figure represent each of the images. The images having appended capital letters of the alphabet A to L are images that have been photographed by a first camera, and the images having appended small letters of the alphabet a to j are images that have been photographed by a second camera. In addition, in FIG. 12, the image capture time differences between images are shown by the distances between rectangles. Specifically, image A and image a have a small image capture time difference, and this is shown by their being close to each other.

Figure 13A:
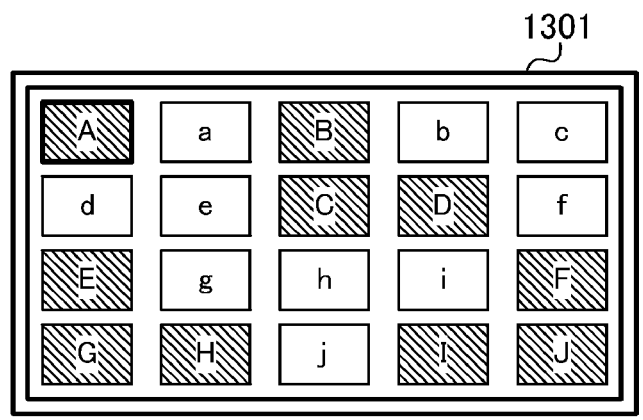
FIGS. 13A-B are drawings for explaining the changes in an index display state that uses the time differences between images in the second embodiment.
Figure 13B:
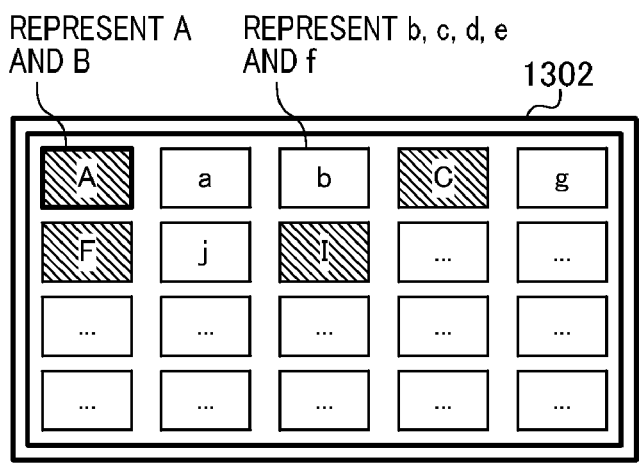

Next, an image of the screen that displays the image data group shown in FIG. 12 in an index display will be explained. FIGS. 13A-B are figures for explaining the changes in the index display state that uses the time differences between images. The screen 1301 in FIG. 13A shows an image when the images shown in FIG. 12 are all displayed in an image capture time sequence, and the screen 1302 in FIG. 13B shows an image of the case in which the images to be displayed are determined by calculating the time differences between each of the images were photographed. In screen 1301, images that have been photographed by two photograph apparatuses are mixed and displayed. In contrast, screen 1302 displays the state for the case in which the time difference for each camera apparatus is calculated to determine the displayed images. Note that here, the time difference threshold that determines the images to be displayed is set to 10 minutes. As shown in screen 1302, by carrying out the determination process to determine the images that are displayed for each camera, each of the images are displayed in respective index displays when the cameras that photographed the images are different, even if images are close in time. For example, image A is shown in the index display as-is or as an image that represents image B, and image a is displayed on the right side thereof. Furthermore, at the right side thereof, image b is displayed in the index display as-is or as an image representing image c to image f.

The images viewed by using the image browsing apparatus 1 are not limited only to those photographed by the same photographing apparatus. Specifically, in the case in which pictures to be displayed are selected based on the result of comparing the time differences between each of the images to a threshold that serves as a determination reference, it can be considered that because which photographic device photographed an image is not taken into consideration, images that have been photographed by a plurality of cameras are displayed in an index display in a mixed state. In the case in which the apparatuses that photographed the images are not distinguished, there is a possibility that necessary images will not be displayed in the index display screen. For example, suppose the case in which an image photographed by a first camera was photographed domestically, and an image photographed by a second camera was photographed overseas. Even if the image capture times are close during a search, the search efficiency is improved by displaying the images photographed in an index display after distinguishing the images captured by each camera. According to the present embodiment, in such a case, all available images to be searched can be displayed in an index display by distinguishing the photographic apparatus and calculating the time differences.

The flow of the basic processing in the second embodiment is similar to that for the case of FIG. 4. However, the flow differs on the point that information that indicates the photographic apparatus associated with the image is acquired, and processing from S601 through S611 is carried out for the image data group that has been photographed by the same apparatus. For example, the example in FIG. 12 assumes the case in which the image capture time difference between image B and image C by a first camera are equal to or greater than a threshold. Because images photographed by a second camera are processed without immediately proceeding to the processing of the next target image photographed by the first camera, the image a, which has an image capture time that is close to image A, is set as the target image, and processing advances. Therefore, the flowchart explained in FIG. 4 can be extended by a method in which the process is switched for each camera or the images are arranged according to the image capture times of representative images after carrying out processing for each camera and the like, and thus, further redundant detailed explanation thereof will be omitted.

Note that the present embodiment need not be applied to all images that are managed by the image managing unit 105 in FIG. 1, and the present embodiment may be applied only to a portion of the image group that is managed by the image managing unit 105.

Next, a third embodiment of the present invention will be explained below with reference to FIG. 14. In the third embodiment, selection of images to be used in an index display implemented in an image browser apparatus uses a method in which an accumulated value of the time differences between images is used. Note that the configuration for realizing the third embodiment and the setting method of the time difference threshold information by the user is identical to the case of the first embodiment, and thus, further redundant explanation thereof is omitted.

FIG. 14 shows an example of a flowchart up to the point in time that the index display image is created, and as an initial condition, a case is shown in which the cursor position in the index display state is at the leftmost upper edge. This means that, in one index display screen, the cursor is positioned over the image having the oldest image capture time.

First, in S1701, detection processing for the cursor position is carried out by the control unit 101 in FIG. 1. In the present example, the cursor position is at the leftmost upper edge, but as explained above, depending on the state, various locations in the index display can be occupied by the cursor. In the next step S1702, calculation processing is carried out to calculate the number of images that should be displayed behind the cursor position in one screen. For example, in the index display state, as shown in FIGS. 2A-C, in the case in which a total of 20 images, that is, 4 columns and 5 rows, are displayed in one screen, the number of images positioned behind the cursor position is 19, and processing in which the 19 displayed images are determined is necessary in order to carry out index display. In S1703, processing is carried out in which an image at the cursor position is stored as a temporarily stored image. Subsequently, the image capture time difference between images is determined based on this temporarily stored image. In S1704, an image having an image capture time that is the next closest to the cursor position image is set as the comparison target image. The comparison target image is a target image that is compared to a temporarily stored image to obtain a time difference, and processing is executed that selects and determines the images to be displayed by updating in sequence the comparison target image.

In S1705, processing is carried out by the time difference calculating unit 107 in which the image capture time differences between the temporarily stored images that have been stored in S1703 and the comparison target image that has been stored in S1704 are calculated. In addition, the managing of each of the images and the image information is carried out by the image managing unit 105, and after the time difference calculating unit 107 has acquired the image capture time of each of the images by the image managing unit 105, the time differences are calculated. In S1706, the display determining unit 110 in FIG. 1 carries out a comparison between the image capture time differences that have been calculated in S1705 and the threshold indicated by the user, and determines whether the time difference is equal to or greater than the threshold. Note that the threshold information is acquired by the user instruction information managing unit 108 in FIG. 1.

In S1706, in the case in which it has been determined that the calculated time difference is equal to or greater than the threshold, the processing proceeds to S1707, and the comparison target image is set as the image to be displayed. At this time, processing that updates the temporarily stored image to the present comparison target image is carried out simultaneously. Subsequently, in S1708, it is determined whether all the images necessary for display have all been selected. In the case in which all images have been selected, the processing proceeds to S1711, while in the case in which not all images have been selected, the processing proceeds to S1709.

In S1709, processing is carried out that determines whether an image close to the next image capture time of the comparison target image is present. Here, in the case in which there is no image after the comparison target image, the selection process for displayed images has completed for the all images of the image data group, and the processing proceeds to S1711. In addition, in the case in which an image following the comparison target image is present, the processing proceeds to S1710, and then processing is carried out in which the comparison target image is updated to the image having the next closest image capture time.

The above processing is repeated, and after all images that are to be displayed in one screen have been determined, in S1711, the display processing unit 112 in FIG. 1 creates an image display layout. Subsequently, the processing proceeds to S1712, an image signal that represents the display layout that has been created in S1711 is output to the monitor 2 in FIG. 1, and the index display image is provided to the user.

According to the explanation in FIG. 14, by implementing the third embodiment, a selection process for selecting the necessary images by using the time difference based on the image capture time of a certain image can be implemented without using an image selection process that employs a threshold between images. Thus, along with the effect that only images for which the time difference between images is separated are selected as representative images, even in an image group having a threshold that is less than a given value, the plural representative images can be can be selected from this image group.

Note that each of the processes shown in each of the embodiments can be realized by executing an image browsing program via a network or various types of recording medium using a processing apparatus such as a computer.

Other Embodiments

Aspects of the present invention can also be realized by a computer of a system or apparatus (or devices such as a central processing unit (CPU) or micro-processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., non-transitory computer-readable storage medium). The program includes computer-executable instructions for implementing the present invention.

An operating system (OS) or other application software running on a computer can execute part or all of actual processing based on instructions of the program to realize the functions one or more of the above-described exemplary embodiments.

Additionally, the program read out of a storage medium can be written into a memory of a function expansion card inserted in a computer or into a memory of a function expansion unit connected to the computer. In this case, based on instructions of the program, a CPU or MPU provided on the function expansion card or the function expansion unit can execute part or all of the processing to realize the functions of one or more of the above-described exemplary embodiments.

A wide variety of storage media may be used to store the program. The storage medium may be, for example, any of a flexible disk (floppy disk), a hard disk, an optical disk, a magneto-optical disk, a compact disc (CD), a digital versatile disc (DVD), a read only memory (ROM), a CD-recordable (R), a CD-rewritable, a DVD-recordable, a DVD-rewritable, a magnetic tape, a nonvolatile memory card, a flash memory device, and so forth.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-131829 filed Jun. 1, 2009 which is hereby incorporated by reference herein in its entirety.

What is claimed is:
1. An image processing apparatus comprising:
a selection unit that selects an image for an index screen from a plurality of images in accordance with a recording time of each of the plurality of images,
wherein the selection unit selects one of two images, where the two images are successive images in a sequence of recording times and a difference between the recording times of the two successive images is larger than a threshold, in accordance with whether the recording times of the two successive images are earlier than a recording time of a predetermined image among the plurality of images, and
wherein, if the recording times of the two successive images are earlier than the recording time of the predetermined image among the plurality of images, the selection unit selects the image having the earlier recording time than the other image among the two successive images, and, if the recording times of the two successive images are later than the recording time of the predetermined image, the selection unit selects the image having the later recording time than the other image among the two successive images; and an output unit that generates an index screen including the image selected by the selection unit and outputs the index screen to a display device.

2. The image processing apparatus according to claim 1, further comprising a control unit that controls the selection unit and the output unit, wherein the index screen is a first index screen and, if an instruction to change the threshold is issued from a user during output of the first index screen by the output unit, the control unit controls the selection unit to select an image for the first index screen in accordance with the changed threshold and controls the output unit to generate a second index screen including the image selected in accordance with the changed threshold by the selection unit, and wherein the output unit switches from the first index screen to the second index screen.

3. A control method for an image processing apparatus, the control method comprising:

selecting an image for an index screen from a plurality of images in accordance with a recording time of each of the plurality of images, wherein one of two images is selected, where the two images are successive images in a sequence of recording times and a difference between the recording times of the two successive images is larger than a threshold, in accordance with whether the recording times of the two successive images are earlier than a recording time of a predetermined image among the plurality of images, and wherein, if the recording times of the two successive images are earlier than the recording time of the predetermined image among the plurality of images, the image having the earlier recording time than the other image among the two successive images is selected, and, if the recording times of the two successive images are later than the recording time of the predetermined image, the image having the later recording time than the other image among the two successive images is selected;

generating an index screen including the selected image; and outputting the index screen to a display device.

4. The control method according to claim 3, wherein, if an instruction to change the threshold is issued from a user during output of the index screen, selecting the image for the index screen includes selecting an image for a first index screen in accordance with the changed threshold and generating the index screen includes generating a second index screen including the image selected according to the changed threshold further comprising:

switching from the first index screen to the second index screen.

5. The image processing apparatus according to claim 1, further comprising an obtaining unit configured to obtain the plurality of images via a network.

6. The image processing apparatus according to claim 1, further comprising an obtaining unit configured to obtain the plurality of images from a recording medium.

7. The image processing apparatus according to claim 1, further comprising a change unit configured to change the threshold in accordance with an instruction from a user, wherein the selection unit selects the image for the index screen based on the changed threshold.

8. The image processing apparatus according to claim 1, wherein the output unit generates the index screen including the predetermined image.

9. The control method according to claim 3, further comprising obtaining the plurality of images via a network.

10. The control method according to claim 3, further comprising obtaining the plurality of images from a recording medium.

11. The control method according to claim 3, further comprising changing the threshold in accordance with an instruction from a user, wherein the image for the index screen is selected based on the changed threshold.

12. The control method according to claim 3, wherein generating the index screen includes generating the index screen including the predetermined image.

* * * * *